Patented June 12, 1951

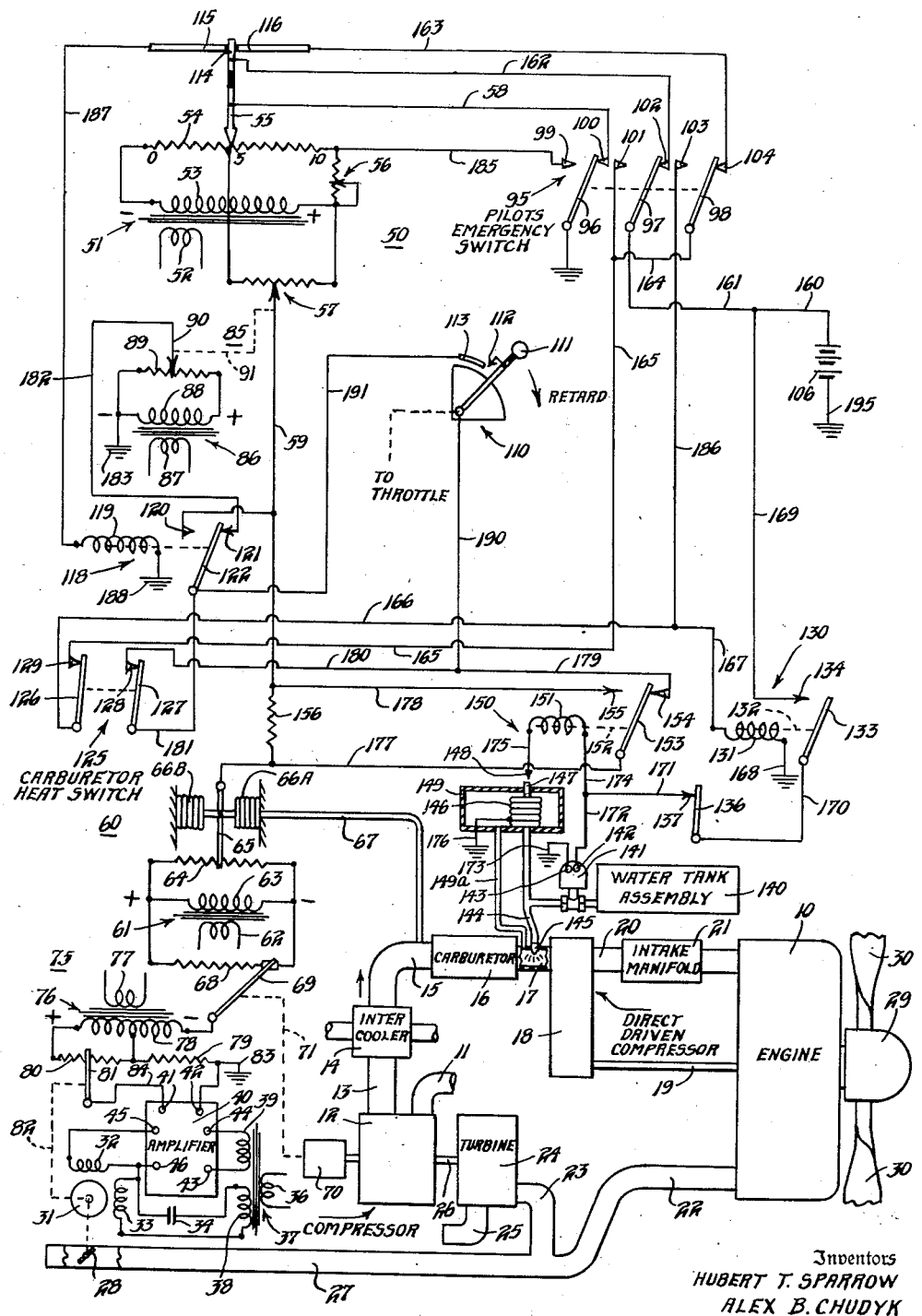

2,556,986

UNITED STATES PATENT OFFICE 2,556,986

CONTROL APPARATUS FOR INTERNAL-COMBUSTION ENGINES

Hubert T. Sparrow, Minneapolis, and Alex B. Chudyk, St. Louis Park, Minn., assignors to Minneapolis-Honeywell Regulator Company, Minneapolis, Minn., a corporation of Delaware Application October 17, 1947, Serial No. 780,596

17 Claims. (Cl. 123—25)

This invention relates generally to improvements in intake manifold pressure control systems for engines having combustion chambers that may be of the internal combustion type, and more particularly to improvements in control systems of this nature for use in connection with antidetonant injection for such engines.

As is well known in the art, it is the present custom, particularly in the case of aircraft engines, to provide a means for compressing air and delivering it to the intake manifold whereby manifold pressures much greater than atmospheric pressures may be obtained and the power output of the engine greatly increased. For this purpose, there is provided a so-called turbosupercharger, consisting of an air compressor and a gas turbine for operating the same. The controlling of this turbine is accomplished by an electrical control system which positions a valve in the exhaust system of the engine according to the input pressure selected by a controller in the network. A pressure sensitive device maintains the selected pressure, regardless of the varying pressures of the intake of the compressor, as when, in the case of an aircraft installation, the aircraft flies at varying altitudes.

It is well known in engine control art, that engine output may be greatly increased by injecting an atomized antidetonant such as water into the fuel intake system of the engine. Injection of this antidetonant into the combustion fuel mixture has the effect of preventing overheating and detonation, permitting the operation of the engine at higher intake manifold pressures than would otherwise be possible.

It is to be understood that while our invention is concerned with any antidetonant injection apparatus, it will hereinafter be referred to as a water injection apparatus as that is the term generally used by those skilled in the art in discussing such an apparatus.

The present invention is concerned with that type of water injection apparatus where water injection is had on a high range of pressures selected by the main controller and not had on the low range of pressures selected. All the pressures may be variably adjusted by the control means whether there is water injection or not, barring failure of portions of the equipment.

In present day craft of larger size, it is customary to have the main engine controls on the flight engineer's deck with only auxiliary controls at the pilot's control panel. In such installations, it is necessary to provide means for the pilot taking over control of the power control of the engine and have a maximum power output should some emergency arrive. Also, in present day craft, where much flying is done at high altitudes, it is necessary to provide means for deicing of the carburetor. This is sometimes accomplished by retarding the throttle and increasing the input pressure in the carburetor on the theory that the heat of the compression will melt any of the ice present. When using a system employing water injection, as is done in the present invention, it is necessary to provide means for shutting down the water injection when the control selector is moved into the advanced range of input pressures to further aid the deicing operation. To protect the engine in the event that the throttle is suddenly advanced, an auxiliary control network is provided and is switched into the circuit to set a maximum "dry" power signal in the control system.

In the event that the pilot needed maximum power output with water injection it would be necessary to provide switching means to by-pass the switching control of the flight engineer and energize a water valve and inject water into the system regardless of the settings of the flight engineer's controls. Operating in connection with a water control valve is a water responsive device which in the absence of its detecting the proper amount of water flowing into the engine will switch the control system over to the auxiliary control network which will establish the maximum "dry" power pressure for the engine.

It is therefore an object of the present invention to provide a control apparatus which provides auxiliary means for switching to a maximum power output pressure with water injection, and providing with this feature a safety cutout for going to an auxiliary control network should the water injection apparatus fail to operate.

A further object of the present invention is to provide in a water injection control apparatus means for deicing the carburetor of the engine by running up carburetor pressures to a high value without water injection, and to provide means for switching to a maximum safe "dry" power in the event the throttle is advanced beyond a certain position.

Another object of the present invention is to provide a water injection system wherein the control selector may be advanced through one range of "dry" values without water injection, and a further range of values with water injection, with means to switch to maximum "wet"

power output with water injection regardless of the setting of the control selector.

These and other more specific and detailed objects will be disclosed in the following specification, reference being had to the accompanying drawing, in which the single figure is a diagrammatical showing of a complete engine with its intake manifold pressure control system, water injection elements and controls therefor, arranged in accordance with the present invention.

Referring now more particularly to the drawing, there is shown an internal combustion engine 10 which is receiving its air for combustion through an intake 11. Compressing of the air is accomplished by compressor 12 which in turn forces the air through conduit 13, intercooler 14, conduit 15, carburetor 16, and conduit 17 to a further direct driven compressor 18. Driving compressor 18 is a shaft 19 directly connected to the engine. Conduit 20 and intake manifold 21 form the output for the compressor 18 and the intake for the engine 10. The exhaust gases from the engine 10 flowing through the conduit 22 and 23 act to drive turbine 24 which has an output conduit 25. A drive shaft 26 connects the turbine 24 to the compressor 12. Controlling the amount of exhaust gases flowing through conduit 27 is a damper or valve 28, known as a waste gate. Connected to the engine 10 is a propeller hub 29 with propellers 30 extending therefrom.

Positioning of the waste gate 28 is accomplished by means of a motor 31 which has a pair of exciting windings 32 and 33 which are spaced electrically 90° apart in order to make possible the inducing of a reversible function into the motor. Energization for the winding 33 is from the transformer 37 which consists of a primary 36 connected to a power source not shown, and two secondary windings 38 and 39. The winding 38 directly energizes the winding 33 through a condenser 34. The other secondary winding 39 of transformer 37 is connected to input terminals 43 and 44 of an amplifier 40. Winding 32 of the motor 31 is energized by amplifier 40 through the terminals 45 and 46 and according to the signal on the input terminals 41 and 42 of the amplifier 40.

The input signal for the amplifier 40 comes from a complex electrical network which consists of a manual control network 50, a pressure control network 60 and a rebalancing network 75. This electrical network cooperates with the amplifier 40 in a manner to be described hereinafter in a way to cause the motor 31 to rotate in one direction or the other depending upon the conditions in the electrical network.

The manual control network 50 consists of a transformer 51 having a primary 52 connected to a power source not shown, and a secondary 53. A slide wire resistor 54 and associated wiper 55 act as the main manual controller while a potentiometer 56 and a potentiometer 57 act in a calibrating capacity, for the maximum "wet" position and the "normal" operating range respectively of positions of the main controller.

The pressure responsive network 60 consists of a transformer 61 having a primary winding 62 connected to a power source, not shown, and a secondary winding 63 which acts to furnish the controlling voltages for a slide wire resistor 64 and its associated wiper 65 controlled by a pair of pressure responsive bellows 66a and b. The duct 67 interconnecting the conduit 15 of the engine and the bellows 66a acts to transmit the pressure from the input of the engine to the bellows 66a. The bellows 66b is an evacuated bellows which is bucking bellows 66a and compensating for changes in atmospheric pressure so that the pressure responsive device will indicate the absolute pressure in the conduit 15. Also energized by secondary winding 63 is a further potentiometer 68 with its associated wiper 69. The wiper 69 is normally biased to the right hand end of the resistor 68 so that it has no function in the control network until such time as the rotational velocity of the turbine 24 and compressor 12 exceeds a safe value. When this occurs a turbine overspeed governor 70 comes into operation and acting through a suitable linkage 71 moves the slider 69 to the left by an amount that will be proportional to the magnitude of overspeed of the turbine 24.

Rebalancing of the electrical network is accomplished by the network 75. This network includes a transformer 76 having a primary winding 77 connected to a power source, not shown, and a secondary winding 78. Associated with this secondary winding 78 is a rebalancing potentiometer 80 with its associated wiper 81 which is positioned by the waste gate motor 31. A further resistor 79 is associated with network 75.

An auxiliary control network 85, which under certain conditions is the main control in the electrical network in a manner to be described hereinafter, consists of a transformer 86 having a primary winding 87 connected to a power source, not shown, and a secondary winding 88. The secondary winding 88 energizes a slide wire resistor 89 and its associated wiper 90, the latter of which is directly coupled to the wiper of calibration potentiometer 57 by a coupling 91.

All of the primary windings of the electrical networks 50, 60, 75 and 85 are energized from a common power source so that the respective phase relations are fixed. Therefore, it may be seen that the signal impressed across the amplifier input terminals 41 and 42 will be the algebraic sum of the electrical potentials developed in the networks 50 or 85, 60 and 75.

Associated with this electrical network are a large number of switches which are used to accomplish the controlling functions of the present invention. A pilot emergency switch 95 consists of switch arms 96, 97 and 98 and associated with the switch arms are contacts 99, 100, 101, 102, 103, and 104. The arms 96, 97 and 98 are mechanically connected together so as to move together. A battery 106 supplies energy to relays associated with some of the switching functions of the apparatus. A further switching arrangement is provided by the throttle mechanism 110. Here, the throttle lever 111 carries a contact 112 which engages a contact surface 113 when the throttle has been advanced to a set position. A still further switching function is accomplished by the slider 55 of the manual control network 50 in that when the slider is in one range of values an electrical circuit will be completed through a wiper 114 and contact surface 115 and while the slider is in a further range of values an electrical circuit will be completed through the wiper 114 and contact surface 116. A control position responsive relay 118 consists of relay winding 119, switch contacts 120 and 121 and an associated switch arm 122. The switch arm 122 is biased by means, not shown, into the position shown on the drawing in which it is in engagement with contact 121 and is movable upon energization of coil 119 into engagement with contact 120. A carburetor heat switch 125 consists of a pair of arms 126 and 127 and their associated contacts 128 and 129. Arms 126 and 127 are mechanically interconnected so as to be movable in unison.

The actuation of the water controlling function of the present invention is accomplished by a relay 130 which consists of a relay winding 131, armature 132, switch arm 133 biased open by means not shown, and an associated contact 134. A propeller feathering switch which consists of switch arm 136 and contact 137 acts as a safety feature in a manner to be described later. The water tank assembly 140 consists of a storage tank for the water supply and suitable pumping means to maintain water pressure in the system. A suitable electric water valve 141 is provided having input terminals 142 and 143. A duct 144 and nozzle 145 act to pass water into the intake system of the engine from the water tank assembly 140. A pressure responsive relay 150 is actuated when a pressure responsive bellows 146 moves into engagement a pair of switch contacts 147 and 148. The pressure responsive bellows 146 is located within a sealed housing 149 which is connected by duct 149a to the carburetor outlet pressure. This housing establishes a substantially constant pressure reference point for the bellows 146. The relay 150 consists of a winding 151, armature 152, switch arm 153 biased open by means, not shown, into engagement with contact 154, and contact 155. A further element in the control network is the isolating resistor 156.

In discussing the operation of the basic regulator apparatus, it will be assumed that during one particular half cycle of the power supply the polarities of the transformer secondaries will be as shown on the drawing. In examining the network 50, it may be seen that with the slider 55 in the mid position of the resistor 54, and the calibration potentiometer in the position shown that there will be a potential which when measured between the ground conductor 58 and the conductor 59 will be positive by a certain amount. Movement of the slider 55 to the left will increase this signal and make it more positive while movement to the right will make the output signal less positive. Assume, for example, that the voltage between the ground conductor 58 and conductor 59 is a plus 6 volts.

Examination of network 60 shows that the polarity of the secondary winding 63 is reversed to that of winding 53, so that movement of slider 65 along resistor 64 to the right produces a voltage that is less negative and movement to the left gives a voltage that is more negative. In measuring the voltage across the network 60 it will be assumed that the slider 69 is in the position shown and therefore the potentiometer 68 has no affect on the circuit. Here, the voltage will be, for example, minus 15 volts when measured between slider 65 and slider 69.

In network 75, it will be noted that the polarity of the secondary winding 78 is positive on the left hand terminal and negative on the right hand terminal. With the winding tapped as shown, there will be a constant positive voltage in the network due to the right half of the winding 78 and a variable tapped positive voltage in the left half of the winding 78 picked off by a slider 81 acting with resistor 80. By assuming a constant voltage of plus 6 volts in the right half of the secondary and a variable tapped voltage of plus 3 volts, the total voltage between the slider 69 and the slider 81 will be plus 9 volts.

Now taking the algebraic sum of the voltages of networks 50, 60, and 75, we have plus 6, minus 15, and plus 9 which totals 0 volts. Therefore, the voltage between the slider 81 and the ground conductor 58 will be 0 or the voltage between the input terminals 41 and 42 of the amplifier 40 will be 0 since the ground conductor 58 is grounded through contact 100 and switch arm 96 of the switch 95 and terminal 42 of the amplifier 40 is grounded at 83. Slider 81 is directly connected to terminal 41 by conductor 84. From this it can be seen that the network is balanced and there will be 0 volts on the input of the amplifier and therefore there will be no output signal in the output winding 32 to cause any rotation of the motor 31.

Should there be a change in pressure in the conduit 15 such that the bellows 66a moves slider 65 toward the left there will be an increase in the negative voltage across the network 60. Assume that this slider changes the voltage on network 60 from a minus 15 to a minus 16 volts. As the networks 50, 60 and 75 are connected in series to the input terminals of amplifier 40, this change in voltage will result in a minus 1 volt appearing on the input of the amplifier. The amplifier now energizes winding 32 and starts repositioning the waste gate 28 in a pressure maintaining direction and will also move the follow up slider 81 toward the left to remove the unbalance created by the movement of slider 65. In other words slider 81 will add a plus 1 voltage in the control network. With the movement of the waste gate there will be a change in the flow of exhaust gases through turbine 24 so that its speed will be modified. The change in speed will change the amount of air compressed by compressor 12 and this will result in a change in pressure in conduit 15 and a change in the position of the pressure slider 65 back to the desired position. As the pressure is restored to the desired value the network will be unbalanced in the opposite direction which unbalance will cause the waste gate 28 to be moved substantially back to its original position. Thus the unbalance voltage in the control network originally due to a change in pressure will have been eliminated by movement of the waste gate follow up slider 81 and the subsequent repositioning of the pressure slider 65.

Movement of the manual control slider 55 will also result in an unbalance on the input terminals of amplifier 40. The waste gate motor will accordingly reposition the waste gate 28 in a direction to correspond to the signal introduced by movement of slider 55. The unbalance created will be balanced out by the subsequent movement of the pressure slider 65 and the follow up slider 81 as soon as the desired pressure change has been brought about.

Should an overspeed condition occur at turbine 12, the overspeed controller 70 will start moving the slider 69 toward the left. This movement will result in a less negative signal being introduced in the control network by network 60. This less negative voltage will result in the moving of waste gate 28 in an open direction so that there will be less gases driving the turbine 12 and its speed will drop off to a safe value.

*Operation with water injection*

In discussing the operation of the turboregulator above no mention was made of the action of the various switching arrangements associated with the present invention as concerns control for water injection. In the design of this turboregulator apparatus, it is desirable when moving the slider 55 of the manual control network 50 from the far left position or the 0 position toward the right that there be an increase in pressure at the intake to the engine. It is also desirable when moving the slider 55 toward the right that there be a range of "dry" values and a range of "wet" values, the former being on the lower range of pressure values and the latter being on the top range of pressure values. Therefore, in the design of such a slider a switching arrangement is provided on the slider which is responsive to the position of the slider 55 on the resistor 54 so that as soon as the high range of values has been reached a switching function will take place to actuate the water control mechanism injecting water into the system. This is accomplished by the switching mechanism on the end of the slider 55 and consists of the wiper 114 acting with contact surfaces 115 and 116. When the slider is in the range from 0 to 5 on the resistor 54 the wiper 114 will be engaging the contact surface 115 and as soon as the high range of positions has been reached the wiper 114 moves into engagement with contact surface 116. The last mentioned connection is maintained as long as the slider is in the range of values of from 5 to 10 on the resistor 54. Control position responsive relay 118 will be deenergized, as shown, when the slider 55 is in the high range of positions (5 to 10). This is because the relay 118 is normally energized by battery 106 through conductors 160 and 161, switch arm 97, switch contact 102, conductor 162, blade 114, contact 115, conductor 187, relay winding 119 to ground 188 and thus back to ground 195 of the battery 106. Obviously, when blade 114 moves out of engagement with contact 115, the relay 118 will be deenergized and arm 122 will engage contact 121.

Assuming that the slider 55 is in the range of from 5 to 10 on resistor 54 and that the blade wiper 114 is in engagement with surface 116, it may be seen that a circuit will be completed to the water injection control relay 130. This circuit may be traced from the positive terminal of the storage battery 106 through conductors 160 and 161, switch arm 97, switch contact 102, conductor 162, wiper 114, contact surface 116, conductor 163, contact 104, switch arm 98, conductor 164, conductor 165, switch contact 129, switch arm 126, conductors 166 and 167, relay winding 131, ground connection 168 and thus to ground connection 195 of the battery 106. When water injection relay 130 becomes energized, the switch arm 133 moves into engagement with the switch contact 134, which action causes the water control valve 141 to be energized. This energizing circuit may be traced from the positive terminal of the battery 106 through conductor 160, conductor 169, switch contact 134, switch arm 133, conductor 170, switch arm 136, switch contact 137, conductors 171 and 172, terminal 142, valve 141, terminal 143 to ground 173 and thus to ground connection 195 of battery 106.

With the energizing of the water control valve 141, water will be permitted to flow through the duct 144 to the nozzle 145 where it will be injected into the intake system of the engine. Also situated on the duct 144 is a pressure responsive bellows 146 which acts to complete the water responsive relay energizing circuit. This last named energizing circuit may be traced from the positive terminal of the battery 106 through conductor 160, 169, switch contact 134, switch arm 133, conductor 170, switch arm 136, switch contact 137, conductor 171, conductor 174, relay winding 151, conductor 175, switch contact 148, switch contact 147, to ground connection 176, and thus to ground connection 195 of battery 106. With the energization of relay 150, it will be noted that the switch arm 153 moves out of engagement with contact 154 and into engagement with contact 155 to effectively by-pass the isolating resistor 156. This by-passing circuit may be traced from the lower terminal of the isolating resistor 156 through conductor 177, switch arm 153, switch contact 155, and conductor 178 back to the upper terminal of the isolating resistor 156. It may now be seen that the turboregulator bridge is acting in its normal capacity for regulating the pressure at the intake of the system and as the slider 55 is moved between the positions 5 and 10 of the resistor 54 the position of the slider will change the pressure in the input accordingly. As long as that slider is in this range there will be water injection barring failure of the water supply system itself. In the event that there should be a water failure, it will be noted that the pressure responsive bellows 146 will retract and open contacts 147 and 148. When these contacts, 147 and 148, are opened the relay 150 will be deenergized and the switch arm 153 will move into engagement with the switch contact 154. When this occurs a new control network is switched into the electrical network. This circuit may be traced from the slider 65 of the pressure responsive network 60 through the conductor 177, switch arm 153, contact 154, conductor 179, conductor 180, switch contact 128, switch arm 127, conductor 181, switch arm 122, switch contact 121, and conductor 182, to the slider 90 of the electrical network 85 which is grounded at 183. This auxiliary control network is so calibrated by the potentiometer wiper 90, which is adjusted by movement of the wiper of calibration potential meter 57, that upon a failure of the water supply system the engine pressure will automatically be switched to a maximum "dry" power position to prevent excess pressures from building up in the engine without water being present.

The action of the isolating resistor 156 is to effectively isolate the control network 50 from the electrical network when there is a direct connection to the auxiliary network 85, as explained above, when the water responsive switch 150 fails to indicate water. When the electrical network 50 is functioning in its normal capacity, with the water responsive relay 150 indicating the presence of water, the resistor 156 will be in the electrical network and will have no effect in that network because there is no voltage induced across the resistor itself. It will be remembered that the input on terminals 41 and 42 of the amplifier 40 is the result of the algebraic sum of the electrical networks 50, 60, and 75 and when there is no voltage induced across the resistor 156 it can be seen that there will be no effect on the control point of the electrical network. However, when the apparatus has switched over to the auxiliary control network 85, the two control networks 85 and 50 would be acting against each other in the control network were it not for the isolating resistor 156 effectively eliminating the signal from the network 50. This resistor actually forms an effective voltage divider which insofar as the signal from network 85 is concerned consists of the resistance 156 and network 50 in series with all of the voltage of the network 85 appearing on slider 65. When the signal from network 50 is considered, the voltage divider consists of the resistor 156 and the network 85. Since the rest of the control network couples to the voltage divider at the junction of the resistor 156 to network 85 and since the resistance of 156 is much greater than that of network 85, the signal from network 50 will be negligible and will not affect the control network.

If it is necessary for the pilot to take over control in an emergency from the flight engineer, it is desirable that the system provide for maximum power. Under these circumstances, the switch 95 is moved from the position shown on the drawing into the maximum power position where the respective switch arms 96, 97, and 98 engage contacts 99, 101, and 103. One effect of moving the switch 95 into the maximum power position is to shift the control point of the electrical network 50 from the slider 55 to the right end of the resistor 54. Since the slider 55 was normally connected to ground by way of conductor 58, contact 100, and switch arm 96, it is but necessary to shift the ground position of the resistor 54 to another position by any means to establish a new control point for the electrical network. Since the maximum power output is desired from the electrical network it is necessary to ground that portion of the resistor 54 which will give a control signal to the amplifier 40 which will cause the waste gate motor 31 to reposition itself to give a higher input pressure to the engine. This so occurs when the right end of resistor 54 is grounded by way of conductor 185, switch contact 99, and switch arm 96. It will be noted that the former grounding circuit for the slider 55 has now been opened with the movement of contact arm 96 from engagement with switch contact 100 to engagement with switch contact 99.

Water injection to the system is established by the movement of switch arm 97 into engagement with contact 101 and the movement of switch arm 98 into engagement with contact 103. The water control relay 130 will now be energized through a new circuit and this may be traced from the positive terminal of the battery 106 through conductors 160, 161, switch arm 97, switch contact 101, conductor 164, switch arm 98, switch contact 103, conductor 186, conductor 169, relay winding 131 to ground 168 and thus to ground 195 at battery 106. As mentioned before, the energizing of the relay winding 131 moves the switch arm 133 into engagement with switch contact 134 to close the energizing circuit for the electrically operated water valve 141 which injects water into the input system of the engine.

As mentioned before, the wiper 114 associated with pressure selecting slider 55 engages either contact surfaces 115 or 116 depending upon the position of the slider arm 55. When this slider arm is in the low range of positions (0 to 5) the wiper 114 engages contact surface 115 and when the pilot emergency switch 95 is in the position shown on the drawing the previously traced energizing circuit for the control position responsive relay 118 will be completed. When the relay 118 is energized it moves the switch arm 122 into engagement with contact 120 and out of engagement with contact 121. With the switch arm 122 in engagement with switch contact 120, it is impossible to establish a circuit to the auxiliary control network 85 as long as these contacts remain closed. This is to prevent the auxiliary control network from being connected into the main electrical network when the slider 55 is positioned in the low range from 0 to 5 on resistor 54. As pointed out above, the circuit for this control position responsive relay 118 is completed when switch arm 97 engages switch contact 102 of the pilot's emergency switch 95. However, when this switch is moved to the maximum power position the switch arm 97 moves into engagement with switch contact 101 and therefore breaks the energizing circuit to relay 118. The switch arm 122 of relay 118 then moves back into engagement with switch contact 121 to make it possible to complete an electrical circuit to the auxiliary control network 85 should a further switching sequence occur.

Assuming again that the pilot has moved the emergency switch 95 in the maximum power position and the water control relay 130 is energized, the water valve relay 141 will also be energized as above explained and with the presence of water the relay 150 will be energized by the action of the bellows 146 closing contacts 147 and 148 to in turn move the switch arm 153 into engagement with switch contact 155. Should the water assembly fail for any reason, the switch contacts 147 and 148 will open due to the retraction of the bellows 146 and the relay 150 will be deenergized moving the switch arm 153 back into engagement with switch contact 154. With switch arm 153 engaging switch contact 154, the auxiliary control network 85 will be switched back into the circuit and this circuit may be traced from the slider 65 of the pressure responsive network 60 through conductor 177, switch arm 153, switch contact 154, conductors 179 and 180, switch contact 128, switch arm 127, conductor 181, switch arm 122, switch contact 121, conductor 182, to slider 90 of the electrical network 85. Here again, the electrical control point of the electrical network will be switched back to a maximum "dry" power position to prevent excessive pressures from being developed in the engine to cause damage thereto.

By switching the pilot's emergency switch 95 back into the position shown on the drawing, the electrical network control point will be shifted back to the slider 55 and the pressure then maintained at the input of the engine will be according to the pressure setting established by the position of the slider 55.

A deicing function may be accomplished by the present apparatus by switching the flight engineer's carburetor heat switch 125 from the position shown so that the switch arms 126 and 127 do not engage their respective contacts 129 and 128. Also, the throttle arm 111 must be in the retarded position so that the switch contact 112 does not engage the surface 113. While deicing, it is also necessary to have the pilot's emergency switch 95 in the position shown on the drawing. With the aforementioned switches in the positions referred to, it will be obvious that the slider 55 may be moved through the entire range of from 0 to 10 without instigating water injection. This may readily be seen when the slider 55 is in the range of from 5 to 10 on the resistor 54, when there is normally water injection, the blade 114 will be engaging contact surface 116. It will be remembered that the circuit that was normally energizing the water control relay 130 was completed from the positive terminal of the battery 106 through conductor 160, conductor 161, switch arm 97, switch contact 102, conductor 162, blade 114, switch contact 116, conductor 163, switch contact 104, switch arm 98, conductor 164, conductor 165, switch contact 129, switch arm 126, conductor 166, conductor 167, and relay winding 131 to ground 168. With the opening of the carburetor heat switch 125, the water control relay energizing circuit will be broken and the relay will not be energized as long as the carburetor heat switch is open. It can therefore be seen that it is possible to have very high carburetor pressures without water injection to thereby aid in the deicing of the carburetor. This, however, is true only so long as the throttle 110 remains in the retarded position.

In discussing operation of the throttle switch, assume first that the slider 55 is positioned between 0 and 5 on the resistor 54 so that the control position responsive relay 118 is energized and its switch arm 122 is in engagement with switch contact 120. The circuit to relay winding 119 is again traced from the positive terminal of the battery 106 through 160, conductor 161, switch blade 97, switch contact 102, conductor 162, blade 114, switch contact 115, conductor 187, and relay winding 119 to ground 188. When the switch arm 122 engages switch contact 120, it is not possible to establish an electrical connection to the network 85 since the switch arm 122 is no longer in engagement with contact 121. Advancing the throttle 111 while the slider 55 is in the low range, will have no switching effect upon the electrical network. However, as soon as the slider 55 is moved into the range of from 5 to 10 on the resistor 54 the relay 118 will be deenergized and the switch arm 122 will move into engagement with switch contact 121. Now, with the movement of the throttle 111 into the advanced position so that the switch contact engages the contacting surface 113 a circuit will be completed to the maximum "dry" power network or auxiliary network 85. This circuit may be traced from the slider 65 of the pressure control network 60 through the conductor 177, switch arm 153, contact 154 (since there is no water present in the system and relay 159 is deenergized), conductor 179, conductor 190, throttle arm 111, switch contact 112, contacting surface 113, conductor 191, switch arm 122, switch contact 121, conductor 182, to slider 90 of the auxiliary control network 85. As in previous cases, the connection of network 85 into the circuit to the amplifier limits the value of the pressure which can be maintained. The throttle switching assembly 110, therefore, is effective to prevent excess pressures being built up in the carburetor during the deicing operation from being allowed to pass to the engine proper and cause damage thereto.

In the event that during the deicing operation by the flight engineer, the pilot should desire maximum power output from the engine with water injection, the closing of the pilot's energizing switch 95 into the maximum power output position would by-pass the carburetor heat switch which was formerly maintaining the water control relay 130 deenergized. This circuit is again traced from the positive terminal of battery 106 through conductors 160 and 161, switch arm 97, contact 101, conductor 164, switch arm 98, contact 103, conductor 186, conductor 167, relay winding 131 to ground 168. When water control relay 130 becomes energized the switch arm 133 again moves into engagement with switch contact 134 to thereby energize the water control valve 141 and the water responsive relay 150 when the contacts 147 and 148 have been closed by the expansion of the bellows 146.

With the carburetor heat switch in the open position and the maximum power switch 95 actuated, should there be a water failure the electrical network will be again switched back to the maximum "dry" power control network 85 by way of the throttle position responsive switches. This circuit may be traced from the slider 65 of the pressure responsive network 60 through the conductor 177, switch arm 153, switch contact 154, conductors 179 and 190, throttle arm 111, switch contact 112, conducting surface 113, conductor 191, switch contact 121, switch arm 122, conductor 182, to slider 90 of the auxiliary control network 85. With the throttle assembly 110 in the retarded position so that the switch contact 112 was not engaging the surface 113, there would be no danger resulting from excess engine pressures for the excessive pressure built up because the control network was in the maximum position would be retained within the carburetor and would not be allowed to pass into the engine because of the fact that the throttle was in the retarded position.

If for any reason it is necessary to feather one of the propellers on a multiple engine installation, the propeller feathering control when actuated causes the propeller to be driven to the full feathered position by means not shown on the drawing. Associated with the feathering control is switch arm 136 and contact 137 which open the water valve energizing circuits whenever a propeller is feathered. With the propeller feathered, the engine will be stopped so obviously water injection would not be wanted here.

From the foregoing it will be noted that an anti-detonant injection control apparatus has been provided which has provisions for deicing of the carburetor of a supercharged engine with pressures normally in excess of those injected into the engine proper without antidetonant injection, and to provide therewith throttle switching means for establishing a maximum "dry" power position in the event the throttle is advanced when the carburetor is being deiced by pressures in excess of those desired at the engine without antidetonant injection.

It may further be seen that a control apparatus has been provided which may be controlled from a remote point to establish a maximum pressure condition on emergency at the intake of a supercharged engine and to further inject antidetonant into that intake system independently of the control settings made elsewhere in the control apparatus.

While we have disclosed our control apparatus in connection with an airplane engine and while it is particularly suitable for such an application there, it is to be understood that it could be employed in any pressure controlled engine. In general, while we have disclosed the specific embodiment of our invention, it is to be understood that this is for purposes of illustration and that our invention is to be limited solely by the scope of the appended claims.

We claim:

1. In control apparatus for controlling the pressure of the air delivered to the intake manifold of an engine having means for injecting an antidetonant into the engine, the combination comprising, regulating means for controlling the pressure of the air, manual means for variably selecting the pressure to be maintained by said regulating means, throttle position responsive means, carburetor heat control means operable to effect heating in the carburetor of an engine, auxiliary means for selecting a fixed pressure to be maintained, and means operable to render effective said auxiliary means and ineffective said manual means when said manual means is positioned in one range of values and said throttle position responsive means is in one range or said carburetor heat control means is not operative.

2. In a control apparatus for controlling the pressure and antidetonant content of air delivered to the intake manifold of an engine, the combination comprising, a complex electrical network for regulating the pressure of air delivered to an engine, said network including control means, pressure responsive means, and balancing means, antidetonant control means, means responsive to the position of the control means of said network, means energizing said antidetonant control means when said last named means is in one range of values, auxiliary control means, antidetonant responsive means, means connecting said auxiliary control means in said network when said antidetonant responsive means does not detect antidetonant, and means operable to energize said antidetonant control means independently of the last named energizing means.

3. In a control apparatus for controlling the pressure and antidetonant content of air delivered to the intake manifold of an engine, the combination comprising, regulating means for controlling the pressure of the air, manual means for variably selecting the pressure to be maintained by said regulating means, control means for affecting injection of antidetonant into the engine, means responsive to the position of said manual means, means including said responsive means actuating said control means when said manual means is in one range of values, safety means operative only on the presence of antidetonant, means connecting said safety control in the actuating circuit of said control means, auxiliary means for selecting a fixed pressure to be maintained, and further means including said responsive means for rendering said auxiliary means effective and said manual means ineffective when said control means is rendered inoperative by said safety means.

4. In a control apparatus for controlling the pressure and antidetonant content of air delivered to the intake manifold of an engine, the combination comprising, regulating means for controlling the pressure of the air, manual means for variably selecting the pressure to be maintained by said regulating means, throttle position responsive means, carburetor heat control means, antidetonant control means, antidetonant responsive means, means responsive to the position of said manual means for actuating said antidetonant control means through said antidetonant responsive means, auxiliary means for selecting a predetermined pressure, and means connecting said auxiliary means to be effective and said manual means ineffective when either said throttle position responsive means or said carburetor heat control means is actuated and said antidetonant responsive means is inoperative.

5. In a control apparatus for controlling the pressure and antidetonant content of air deliverered to the intake manifold of an engine, the combination comprising, regulating means for controlling the pressure of the air, manual means for variable selecting the pressure to be maintained by said regulating means, emergency pressure control means operable when actuated to establish a predetermined pressure, antidetonant control means, means responsive to the position of said manual means, means including said position responsive means for actuating said antidetonant control means when said manual means is in one range of values, and means including said emergency pressure means for energizing said antidetonant control means regardless of the position of said manual means.

6. In a control apparatus for controlling the pressure and antidetonant content of air delivered to the intake manifold of an engine, the combination comprising, a complex electrical network, said network including control means, pressure responsive means, and balancing means, carburetor heat switch means, throttle position responsive means, antidetonant control means, means responsive to the position of the control means of said network, means normally energizing said antidetonant control means when the control means of said network is in one range of values, means for deenergizing said antidetonant control means including said carburetor heat switch means, auxiliary control means, and means connecting said auxiliary control means in said network when said carburetor heat switch means is deenergizing said antidetonant control means and said throttle responsive means is actuated.

7. In a control apparatus for controlling the pressure and antidetonant content of air delivered to the intake manifold of an engine, the combination comprising, a complex electrical network, said network including control means, pressure responsive means, and balancing means, carburetor heat switch means, throttle position responsive means, antidetonant control means, means responsive to the position of the control means of said network, means normally energizing said antidetonant control means when the control means of said network is in one range of values, means for deenergizing said antidetonant control means including said carburetor heat switch means, auxiliary control means, means connecting said auxiliary control means in said network when said carburetor heat switch means is deenergizing said antidetonant control means and said throttle responsive means is actuated, and further means for disconnecting said auxiliary control means from said network and energizing said antidetonant control means independently of said carburetor heat switch means.

8. In a control apparatus for controlling the pressure and antidetonant content of air delivered to the intake manifold of an engine, the combination comprising, regulating means for controlling the pressure of the air, manual means for variably selecting the pressure to be maintained by said regulating means, emergency pressure control means operable when actuated to establish a predetermined pressure, antidetonant control means, means responsive to the position of said manual means, means including said position responsive means for actuating said antidetonant control means when said manual means is in one range of values, auxiliary pressure control means, antidetonant responsive means, means including said emergency pressure control means for energizing said antidetonant control means regardless of the position of said manual means, and further means including said antidetonant responsive means for rendering only said auxiliary pressure control means effective to control the pressure maintained by said regulating means when said antidetonant control is rendered inoperative by said antidetonant responsive means.

9. In a control apparatus for controlling the pressure and antidetonant content of air delivered to the intake manifold of an engine, the combination comprising, control means including a slider normally connected to ground for variably adjusting the controlling effect of said means, pressure responsive means, balancing means, means connecting said control means, said pressure responsive means and said balancing means in a complex electrical network, the output of which is between a point on said balancing means and ground, regulating means connected to the output of said network to regulate the air pressure to the engine, switch means responsive to the position of the slider of said control means, antidetonant control means, means energizing said antidetonant control means including said switch means when the slider of said control means is in one range of values, and auxiliary switch means operable to energize said antidetonant control means independently of said responsive switch means.

10. In a control apparatus according to claim 9 wherein said auxiliary switch means renders inoperative the slider of said control means and connects one portion of said control means to ground to call for a maximum pressure at said regulating means.

11. In a control apparatus for controlling the pressure and antidetonant content of air delivered to the intake manifold of an engine, the combination comprising, control means including a slider normally connected to ground for variably adjusting the controlling effect of said means, pressure responsive means, balancing means, means connecting said control means, said pressure responsive means and said balancing means in a complex electrical network, the output of which is between a point on said balancing means and ground, regulating means connected to the output of said network to regulate the air pressure to the engine, switch means responsive to the position of the slider of said control means, antidetonant control means, means energizing said antidetonant control means including said switch means when the slider of said control means is in one range of values, and carburetor heat switch means operable to deenergize said antidetonant control means when energized by said responsive switch means, said carburetor switch means permitting full movement of the slider of said control means without energizing said antidetonant control means.

12. In a control apparatus for controlling the pressure and antidetonant content of air delivered to the intake manifold of an engine, the combination comprising, control means including a slider normally connected to ground for variably adjusting the controlling effect of said means, pressure responsive means, balancing means, means connecting said control means, said pressure responsive means and said balancing means in a complex electrical network, the output of which is between a point on said balancing means and ground, regulating means connected to the output of said network to regulate the air pressure to the engine, switch means responsive to the position of the slider of said control means, antidetonant control means, means energizing said antidetonant control means including said switch means when the slider of said control means is in one range of values, auxiliary control means, throttle switch means, carburetor heat switch means, means including said carburetor heat switch means operable to deenergize said antidetonant control means, and means including said throttle switch means for connecting said auxiliary control means in said network when said throttle switch is actuated.

13. In a control apparatus for controlling the pressure and antidetonant content of air delivered to the intake manifold of an engine, the combination comprising, control means including a slider normally connected to ground for variably adjusting the controlling effect of said means, pressure responsive means, balancing means, means connecting said control means, said pressure responsive means and said balancing means in a complex electrical network, the output of which is between a point on said balancing means and ground, regulating means connected to the output of said network to regulate the air pressure to the engine, switch means responsive to the position of the slider of said control means, antidetonant control means, means energizing said antidetonant control means including said switch means when the slider of said control means is in one range of values, auxiliary switch means, means including said auxiliary switch means for energizing said antidetonant control means and reconnecting said network to call for a maximum pressure at said regulating means, antidetonant responsive means, auxiliary control means, means including said antidetonant responsive means for connecting said auxiliary control means in said network when said antidetonant responsive means fails to operate.

14. In control apparatus for controlling the pressure and antidetonant content of air delivered to the intake manifold of an aircraft engine, the combination comprising, means for controlling the pressure of the air, a manual selector adapted to be located at one point in an aircraft for adjusting said pressure controlling means to select the pressure maintained thereby, antidetonant control means for causing antidetonant to be supplied to said engine, means normally operative upon said manual selector being moved to a high range to cause said antidetonant control means to assume an antidetonant supplying condition, means for selectively rendering said last named means ineffective when high pressures are desired without the injection of an antidetonant, and means including a controller adapted to be located at a remote point from said manual selector and effective upon actuation thereof to cause said pressure controlling means and said antidetonant control means to assume conditions causing a high pressure and injection of the antidetonant to be maintained regardless of the positions of said manual selector or of said previously named means.

15. In a condition control apparatus, the combination comprising, a complex balanceable electrical network, said network having a pair of output terminals and a manually adjusted member normally connected to one of said terminals to adjust the balance of said network, condition controlling means connected to and affected by said network for maintaining a condition within predetermined limits in accordance with the balance of said network, condition responsive means connected in controlling relation to said network and adapted to effect operation of said controlling means upon the controlled condition assuming a value indicative of the need for a change in the condition, and manually operated switch means connected to one of said output terminals, said switch means being operative when actuated to shift said one output terminal to another position in said network where a predetermined unbalance will exist on said network which is independent of the position of said member and which is such as to call for a maximum of the controlled condition.

16. In a condition control apparatus, the combination comprising, a complex balanceable electrical network, said network having a pair of output terminals and a manually adjusted member normally connected to one of said terminals to adjust the balance of said network, condition controlling means connected to and affected by said network for maintaining a condition within predetermined limits in accordance with the balance of said network condition responsive means connected in controlling relation to said network and adapted to effect operation of said controlling means upon the controlled condition assuming a value indicative of the need for a change in the condition, switch means connected to one of said output terminals, said switch means being operative when actuated to shift said one output terminal to another point in said network where a predetermined unbalance will exist on said network, and second switch means connected to said network for establishing a further unbalance of said network which will call for a value of the controlled condition which is less than that called for by the operation of said first switch means, said second switch means being operated upon said condition going beyond a maximum safe value.

17. In a condition control apparatus, the combination comprising, a complex balanceable electrical network, said network having a pair of output terminals and a manually adjusted member normally connected to one of said terminals to adjust the balance of said network, condition controlling means connected to and affected by said network for maintaining a condition within predetermined limits in accordance with the balance of said network condition responsive means connected in controlling relation to said network and adapted to effect operation of said controlling means upon the controlled condition assuming a value indicative of the need for a change in the condition, switch means connected to one of said output terminals, said switch means being operative when actuated to shift said one output terminal to another point in said network where a predetermined unbalance will exist on said network, and second switch means connected to said network for establishing a further unbalance of said network which will call for a value of the controlled condition which is less than that called for by the operation of said first switch means, said second switch means being operated upon said condition going beyond a maximum safe value, said first switch means being effective regardless of the position of said manually adjusted member and said second switch means being effective only when said manually adjusted member is within a predetermined range and said first switch means is not operative.

HUBERT T. SPARROW.
ALEX B. CHUDYK.

REFERENCES CITED

The following references are of record in the file of this patent:

UNITED STATES PATENTS

| Number | Name | Date |
|---|---|---|
| 2,392,565 | Anderson et al. | Jan. 8, 1946 |
| 2,431,590 | Smith | Nov. 25, 1947 |